United States Patent [19]
Cline et al.

[11] Patent Number: 5,655,094
[45] Date of Patent: Aug. 5, 1997

[54] POP UP SCROLL BAR

[75] Inventors: Troy Lee Cline, Cedar Park; Scott Harlan Isensee, Georgetown; Ricky Lee Poston, Austin, all of Tex.; Jon Harald Werner, Oceanside, Calif.

[73] Assignee: International Business Machines Corporation, Armonk, N.Y.

[21] Appl. No.: 536,881

[22] Filed: Sep. 29, 1995

[51] Int. Cl.⁶ .................................................. G06F 3/14
[52] U.S. Cl. ........................ 395/341; 395/347; 395/339; 395/973; 395/974; 345/123
[58] Field of Search ...................... 395/157, 159, 395/155, 341, 347, 339, 340, 342, 348, 349, 350, 973, 974, 975; 345/123, 121, 145, 125

[56] References Cited

U.S. PATENT DOCUMENTS

| | | | |
|---|---|---|---|
| 5,230,063 | 7/1993 | Hoeber et al. | 395/348 X |
| 5,243,697 | 9/1993 | Hoeber et al. | 395/349 X |
| 5,263,134 | 11/1993 | Paal et al. | 395/342 |
| 5,276,795 | 1/1994 | Hoeber et al. | 395/353 |
| 5,331,335 | 7/1994 | Iida | 345/121 |
| 5,333,247 | 7/1994 | Gest et al. | 395/341 X |
| 5,335,323 | 8/1994 | Kolnick | 395/340 |
| 5,347,626 | 9/1994 | Hoeber et al. | 395/354 |
| 5,485,174 | 1/1996 | Henshaw et al. | 345/123 |
| 5,528,260 | 6/1996 | Kent | 395/341 X |

*Primary Examiner*—Raymond J. Bayerl
*Attorney, Agent, or Firm*—Diana L. Roberts; Thomas E. Tyson

[57] ABSTRACT

A method, apparatus, and article of manufacture for causing a computer to directly scroll the contents of window in any direction. The window could be a folder, document, or any container for retaining information. The contents of the window are too large to be simultaneously displayed on the display screen. The method includes the first step of moving a visible view indicator of a scrolling mechanism in a direction consistent with movement of a pointer means in response to the pointer means being positioned and activated over the visible view indicator using user controls. The second step includes the step of scrolling the contents of the window on the display screen in a direction substantially opposite to the movement of the pointer means and the visible view indicator.

5 Claims, 4 Drawing Sheets

POP UP SCROLL BAR

BACKGROUND OF THE INVENTION

1. Field of the Invention

The present invention relates to user interfaces for computer systems and, more particularly, to an improved user interface for scrolling a window.

2. Background Information and Description of the Related Art

A user interacts with a computer system via a user interface. Conventional user interfaces utilize a pointer (e.g., mouse cursor) to control/manipulate windows and the contents of those windows. A user controls the mouse pointer using a pointing device (e.g., mouse). A mouse typically has one or more buttons for controlling the mouse pointer.

An opened window can display the contents of folders and storage media (e.g., diskettes). FIG. 1 illustrates a conventional window 110, having icons 120 stored therein. Window 110 includes scroll bars 102 and 104 for scrolling icons 120 vertically and horizontally, respectively. For example, if the user desires to scroll icons 120 vertically downward, the user clicks pointer 118 over down arrow 106 to do so. Alternatively, if the user desires to scroll icons 120 vertically upward, the user clicks pointer 118 over up arrow 108. The user may scroll icons 120 horizontally using horizontal scroll bar 104. To scroll icons 120 to the right, the user clicks on left arrow 112. To scroll icons 120 to the left, the user clicks on right arrow 114.

Because sliders 122 and 124 do not completely fill the space in scroll bars 102 or 104, respectively, they indicate that the entire contents of window 110 are too large to be currently displayed. To know exactly which portion of window 110 the user is viewing, the user must concurrently examine sliders 122 and 124. Because slider 122 is at the top of scroll bar 102 and because slider 124 is at the far right of scroll bar 104, the user can surmise that he is viewing the upper right portion of window 110.

Conventional scroll bars 102 and 104 provide certain limitations and disadvantages. First, neither scroll bar 102 or 104 directly allows the user to scroll the contents of window 110 diagonally. To scroll the contents of window 110 diagonally, the user must first manipulate scroll bar 102 (or 104) and then manipulate scroll bar 104 (or 102). This process is tedious and time consuming because the user must adjust both sliders 122 and 124 within both scroll bars 102 and 104, respectively. Further, for the user to determine which portion of window 110 he is viewing, the user must interpret the positions of the two sliders within each's respective scroll bar.

Accordingly, it would be extremely desirable for a user interface to provide a single scrolling mechanism that allows a user to scroll the contents of a window/document horizontally, vertically, and/or diagonally by moving the scrolling mechanism. This new scrolling mechanism should also allow the user to instantaneously know the portion of the window document he is viewing.

SUMMARY

The present invention includes a method, apparatus, and article of manufacture for causing a computer to directly scroll the contents of window in any direction. The "window" could be a folder, document, or any container for retaining information. The contents of the window are too large to be simultaneously displayed on the display screen. The method includes the first step of moving a visible view indicator of a scrolling mechanism (pop up scroll bar) in a direction consistent with movement of a pointer means (e.g., mouse pointer) that is positioned and activated over the visible view indicator using user controls (e.g., a mouse). The second step includes of scrolling the contents of the window on the display screen in a direction substantially opposite to the movement of the pointer means and the visible view indicator.

DETAILED DESCRIPTION OF THE PREFERRED EMBODIMENT

Figure 1:
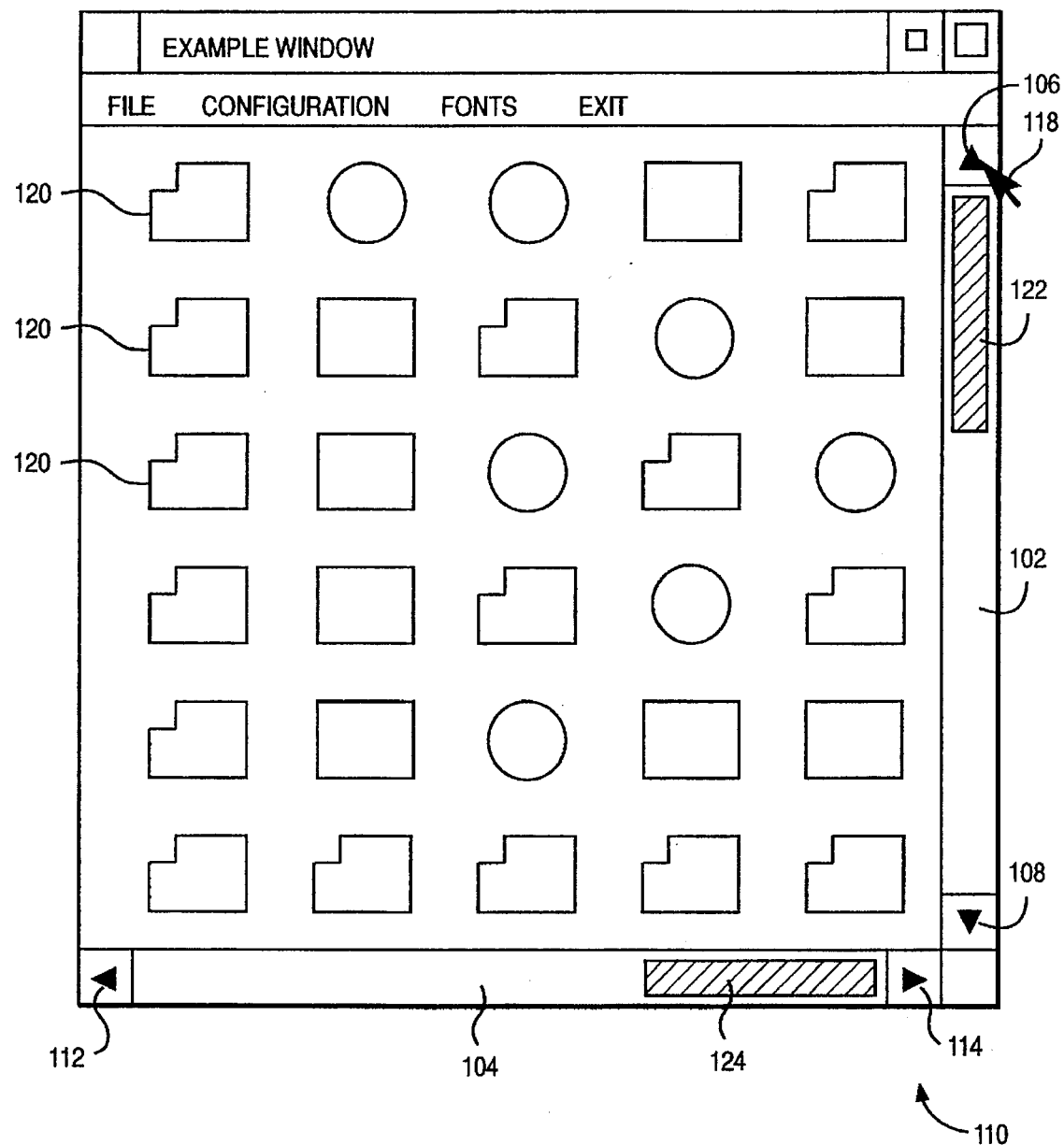
FIG. 1 illustrates a prior art display screen having a conventional window displayed thereon.
Figure 2:
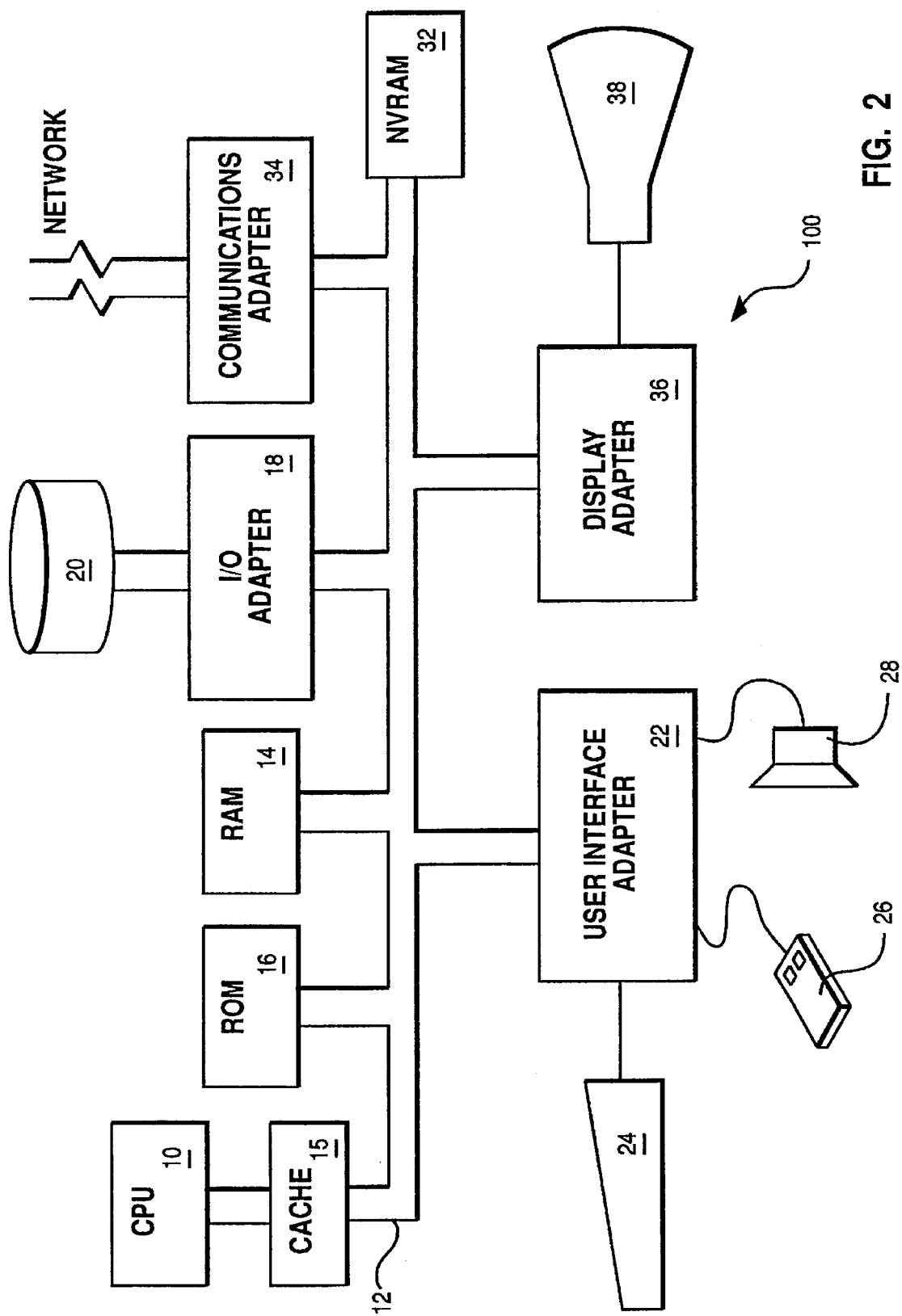
FIG. 2 illustrates a conventional workstation for use with the present invention.

The present invention is practiced in a laptop computer or, alternatively, in the computer system illustrated in FIG. 2. Computer system 100 includes central processing unit (CPU) 10, such as an IBM's™PowerPC™601 or Intel's™486 microprocessor for processing cache 15, random access memory (RAM) 14, read only memory 16, and non-volatile RAM (NVRAM) 32. One or more disks 20, controlled by I/O adapter 18, provide long term storage. A variety of other storage media may be employed, including tapes, CD-ROM, and WORM drives. Removable storage media may also be provided to store data or computer process instructions.

Instructions and data from the desktop of any suitable operating system, such as Sun Solaris™, Microsoft's Windows NT™, IBM's OS/2™, or Apple's System 7™, control CPU 10 from RAM 14. Accordingly, the desktop executes from RAM 14. However, in the preferred embodiment, an IBM RISC System/6000™runs the AIX™ operating system. As previously described, however, one skilled in the art readily recognizes that other hardware platforms and operating systems may be utilized to implement the present invention.

Users communicate with computer system 100 through I/O devices (i.e., user controls) controlled by user interface adapter 22. Display 38 displays information to the user, while keyboard 24, pointing device 26, and speaker 28 allow the user to direct the computer system. Communications adapter 34 controls communications between this computer system and other processing units connected to a network by network interface 40. Display adapter 36 controls communications between this computer system and display 38.

Figure 3:
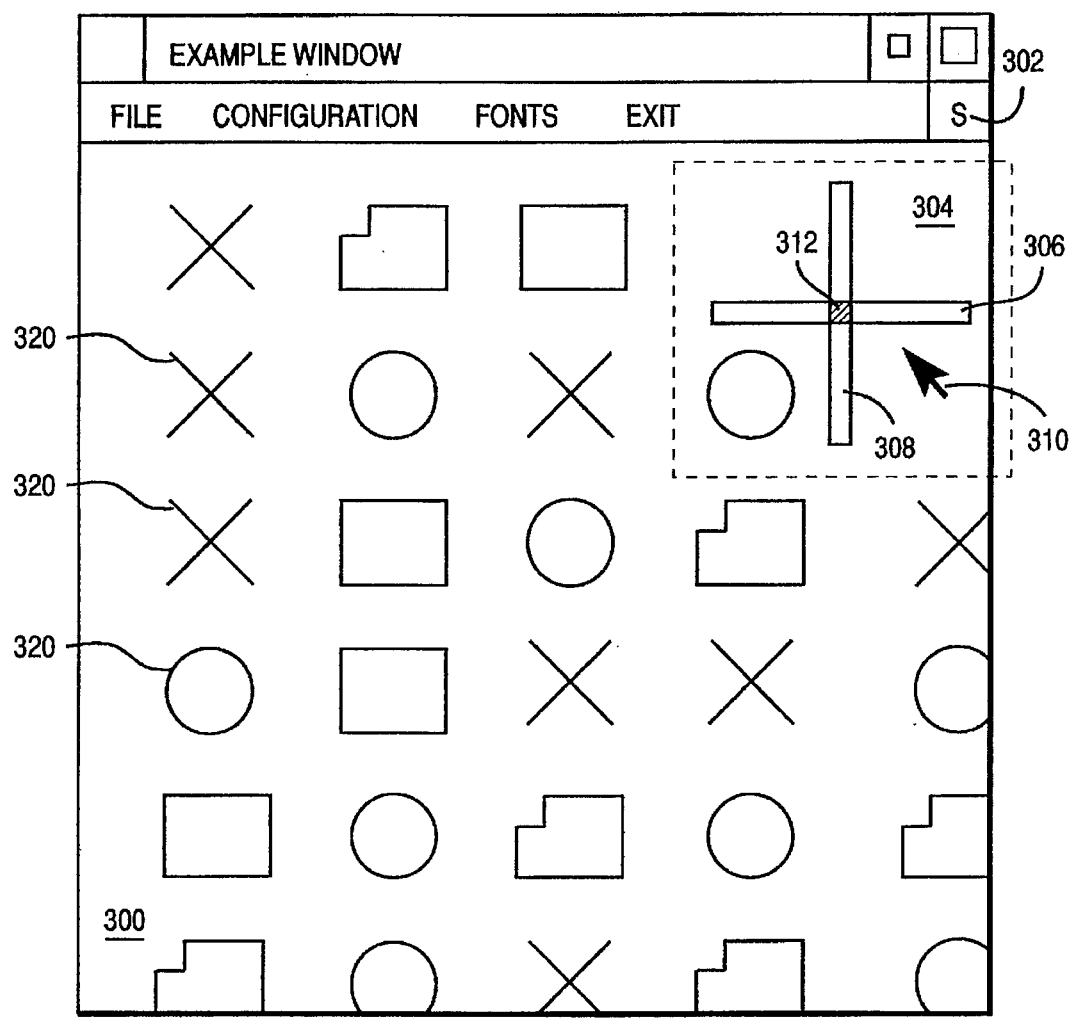
FIG. 3 illustrates a window having a scrolling device that automatically scrolls the contents of the window in any direction in response to user controls.

FIG. 3 illustrates a desktop for displaying a portion of the contents of a window 300. Window 300 could be a folder, document, or any container for retaining information. The contents of window 300 are too large to be simultaneously displayed on the display screen.

The desktop includes button 302 for displaying/removing pop up scroll bar 304 from the display 38. Alternative methods of displaying pop up scroll bar 304 include pressing a particular mouse button or buttons and using a particular combination of keyboard keys. If pop up scroll bar 304 was launched by mouse buttons, it would appear at its current mouse pointer position. Scroll bar 304 would only be displayed as long as the mouse button was pressed. When the user releases the mouse button, scroll bar 304 disappears. The user activates scroll bar 304 by moving the mouse pointer while the mouse button is depressed and the pop up scroll bars are visible.

Pop up scroll bar 304 scrolls the contents (e.g., icons 320, text) of window 300 in any direction in response to movements of pointer 310 over pop up scroll bar 304. Pop up scroll bar 304 further includes horizontal bar 306, vertical bar 308, and visible view indicator 312. Visible view indicator 312 is the intersection of vertical bar 308 and horizontal bar 306 and represents the portion of the contents that is currently being displayed. To manipulate pop up scroll bar 304, the user positions mouse pointer 310 over visible view indicator 312. While holding down the first button on the mouse, the user then moves mouse pointer 310 in a desired direction. In turn, the contents of window 300 scroll in the opposite direction of the movement of mouse pointer 310. For example, if the user desires to view the upper right portion of the contents of window 300, the user merely positions mouse pointer 310 over visible view indicator 312 while holding down the first mouse button and then moves the mouse pointer 310 in a right diagonal direction. In doing so, the contents (e.g., icons 320) scroll in a southwestern direction.

Figure 4:
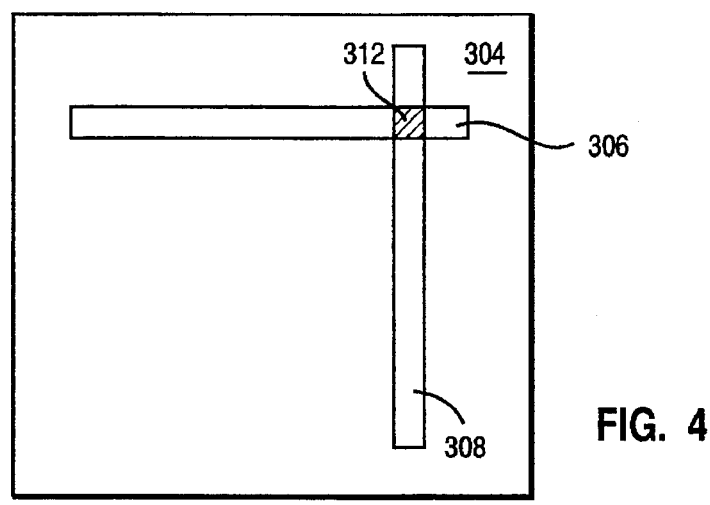
FIG. 4 illustrates a different view of the scrolling device shown in FIG. 3.

FIG. 4 illustrates pop up scroll bar 304 after such a movement has been made. Importantly, the position of horizontal bar 306 and vertical bar 308 has shifted relative to one another to indicate that the user is now viewing the northeast portion of the contents of window 300. Accordingly, horizontal bar 306 represents the entire width of the contents of the folder, while vertical bar 308 represents the entire length of the contents in the folder. The size of visible view indicator 312 indicates the relative proportion of the total folder that is currently visible in the window. Similarly, the user could view the southwestern portion of the contents of window 300 by positioning and activating pointer 310 over visible view indicator 312 and then moving pointer 310 in a southwestern direction. In this manner, pop up scroll bar 304 allows the user to, in a single flowing movement, scroll the contents of window 300 in any direction, including upward, downward, left, right, or in any diagonal direction. Further, the user knows exactly which portion of window 300 he is viewing simply by viewing visible view indicator 312 and the position of horizontal bar 306 relative to the position of vertical bar 308. Additionally, if the scroll bar is launched by pressing a mouse button, the user need not move the pointer to the edge of the window to move the window view.

Figure 5:
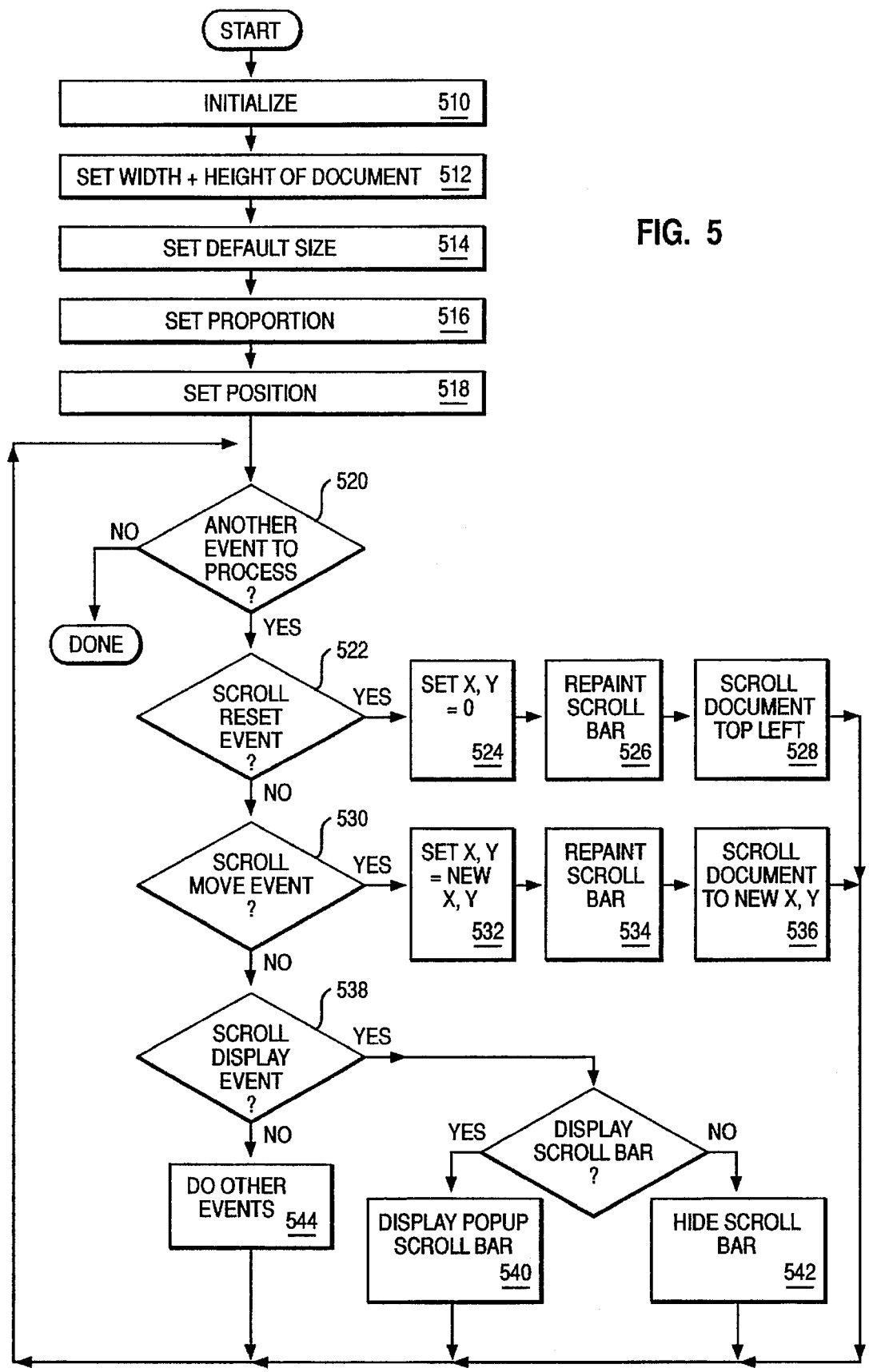
FIG. 5 illustrates a flowchart of detailed logic for implementing the preferred embodiment.

FIG. 5 illustrates a flowchart of detailed logic for implementing the preferred embodiment. At 510, the initialization process begins. At 512, the desktop retrieves the width and length of the document the user desires to view. The desktop determines the ratio between the length and width of the document. For example, the document may be four times longer than it is wide (i.e., 4:1 ratio). At 514, the desktop sets the default size of scroll bar 304. At 516, the desktop sets a ratio of movement for the contents of the window in accordance with the ratio of the length and width of the document. For example, if the document has a 4:1 ratio and the user moves cross section 312 of scroll bar 304 in a northwestern diagonal direction, the document scrolls vertically four times as fast as it scrolls horizontally. At 518, the desktop sets the position for scroll bar 304 based on the ratio of the length and width of the document. For example, if the document is twice as wide as it is long, horizontal bar 306 will be twice as long as vertical bar 308.

At 520, the desktop determines if events are to be processed. If so, at 522, the desktop determines if a scroll reset event has occurred. This event occurs immediately when a document is opened. If so, at 524, x,y coordinates for scroll bar 304 are set to 0. At 526, scroll bar 304 is updated in accordance with the x, y coordinates and at 528, the desktop scrolls the document to the top left (i.e., x=0, y=0). Control returns to 520.

At 530, the desktop determines if a scroll move event has occurred (i.e., the user has positioned and activated the mouse pointer over visible view indicator 312 of scroll bar 304). If so, the desktop monitors the movement of the pointer and sets x, y to the new x, y coordinates as the pointer moves. At 534, the desktop repaints scroll bar 304 (i.e., horizontal bar 306, vertical bar 308, and visible view indicator 312) based on the new x, y coordinates. At 536, the desktop scrolls the document to the new x, y coordinates. Control returns to 520.

At 538, the desktop determines if a scroll display event has occurred (e.g., the user has clicked over button 302). If so, the desktop displays scroll bar 304. If not, at 542, the desktop hides scroll bar 304. At 544, other events may be processed. Control returns to 520. If no other events are to be processed, the process ends.

The following illustrates code for implementing the preferred embodiment:

```
--- INITIALIZATION ---
    // Get size of the document
    //
    docW = get width of document
    docH = get height of document
    // Set size of the scrollbar control to default size. This is
    // obtained from a resource file.
    //
    scrollW = defaultScrollWidth
    scrollH = defaultScrollHeight
    // Proportionality variables. How much to scroll the document
    // when scrollbar is adjusted.
    //
    propX = docW / scrollW
    propY = docH / scrollH
    // This will initialize the scrollbar to upper left hand position.
    //
    Send (SCROLL_RESET) Event
--- EVENT PROCESSING ---
    WHILE (more events to process)
        //
        // The scrollbar by default is hidden and is not displayed
        // until the user requests it. This can be done by a keyboard
        // combination, mouse click on object, menu option, etc. When
        // this takes place, a SCROLLBAR_DISPLAY event is
        // generated.
        //
        IF (SCROLLBAR_DISPLAY Event)
            IF (scrollbar is visible)
                display scrollbar
            ELSE
                hide scrollbar
            ENDIF
        ENDIF
        //
        // This event is caused by input to the scrollbar. This can be
        // by either a pointer device such as a mouse or keyboard.
        //
        IF (SCROLL_MOVE Event)
            oldx = newx
            oldy = newy
            newx = mouse current x location
            newy = mouse current y location
            //
```

```
                                -continued

// Repaint the scrollbar to reflect its new orientation.
        // The location of the scrollbar is not changing here, just
        // how the scrollbar appears is changing. See diagrams.
        //
        Repaint scrollbar to reflect change
                Repaint X Axis at newx position
                Repaint Y Axis at newy position
                Scroll document in the x direction by ((newx - oldx) *
                propx)
                Scroll document in the y direction by ((newy - oldy) *
                propy)
        ENDIF
        IF   (SCROLL_RESET Event)
                newx = 0
                newy = 0
                //
                // Repaint the scrollbar to reflect upper left-hand-corner.
                //
                Repaint scrollbar to reflect change
                        Repaint X Axis at newx position
                        Repaint Y Axis at newy position
                        Scroll document to full left direction.
                        Scroll document to full top direction.
        ENDIF
        //
        // Process other events
        //
        IF   (Other Events)
                process other events
        ENDIF
ENDWHILE
```

While the invention has been shown and described with reference to particular embodiments thereof, it will be understood by those skilled in the art that the foregoing and other changes in form and detail may be made therein without departing from the spirit and scope of the invention, which is defined only by the following claims.

We claim:

1. A computer implemented method for scrolling contents of a window on a display screen, comprising the steps of:
   in response to a pointer being positioned and activated over a visible view indicator of a scrolling mechanism displaying a horizontal bar representing the window contents width and a vertical bar representing the window contents length where a portion of the horizontal bar intersects a portion of the vertical bar to define said visible view indicator, moving the visible view indicator in a direction consistent with the movement of the pointer; and
   scrolling the contents of the window on the display screen in a direction substantially opposite to movement of the pointer and the visible view indicator.

2. The method according to claim 1 wherein the visible view indicator indicates a portion of the contents currently being displayed on the display screen.

3. The method according to claim 2 wherein movement of the visible view indicator causes the vertical bar to move with respect to the horizontal bar, such that the visible view indicator indicates which portion of the contents are currently being displayed.

4. A computer system for scrolling the contents of a window on a display screen, comprising: means for moving a visible view indicator in response to a pointer being positioned and activated over the visible view indicator of a scrolling mechanism displaying a horizontal bar representing the window contents width and a vertical bar representing the window contents length where a portion of the horizontal bar intersects a portion of the vertical bar to define said visible view indicator, said visible view indicator moving in a direction consistent with the movement of the pointer; and means for scrolling the contents of the window on the display screen in a direction substantially opposite to movement of the pointer and the visible view indicator.

5. An article of manufacture, having a computer usable medium having computer readable program code means embodied therein for scrolling the contents of a window on a display screen, comprising:

computer readable program means for displaying a horizontal bar representing the window contents width and a vertical bar representing the window contents length where a portion of the horizontal bar intersects a portion of the vertical bar to define a visible view indicator;

computer readable program means for moving the visible view indicator in response to a pointer being positioned and activated over the visible view indicator in a direction consistent with the movement of the pointer means; and computer readable program means for scrolling the contents of the window on the display screen in a direction substantially opposite to movement of the pointer and the visible view indicator.

* * * * *